April 8, 1930.  L. E. LA BRIE  1,753,208
BRAKE SHOE
Filed Dec. 5, 1928

INVENTOR.
LUDGER E. LA BRIE
BY H. O. Clayton
ATTORNEY

Patented Apr. 8, 1930

1,753,208

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed December 5, 1928. Serial No. 323,812.

This invention relates to brake shoes and is illustrated as embodied in a shoe for an internal expanding automobile brake. An object of the invention is to provide a shoe built up of stampings, preferably in such a manner as to form a generally channel-section shoe.

In one desirable arrangement there are two sections L-shaped in cross section arranged to face toward each other, one of said sections having a shorter web than the other. Preferably the outer flanges of these sections are superposed, and advantage may be taken of this arrangement to secure the lining of the shoe with the rivets or other fastenings which fasten the sections together.

Another important feature of the invention relates to a novel construction at the cam applying end of the shoes wherein a thrust link having a laterally extending portion is securely nested and confined within a space defined by the longer web portion of the shoe, an end flange on said web, and a cup-shaped flange at the end of the rim of the shorter webbed and reinforcing section of the shoe.

Figure 1:
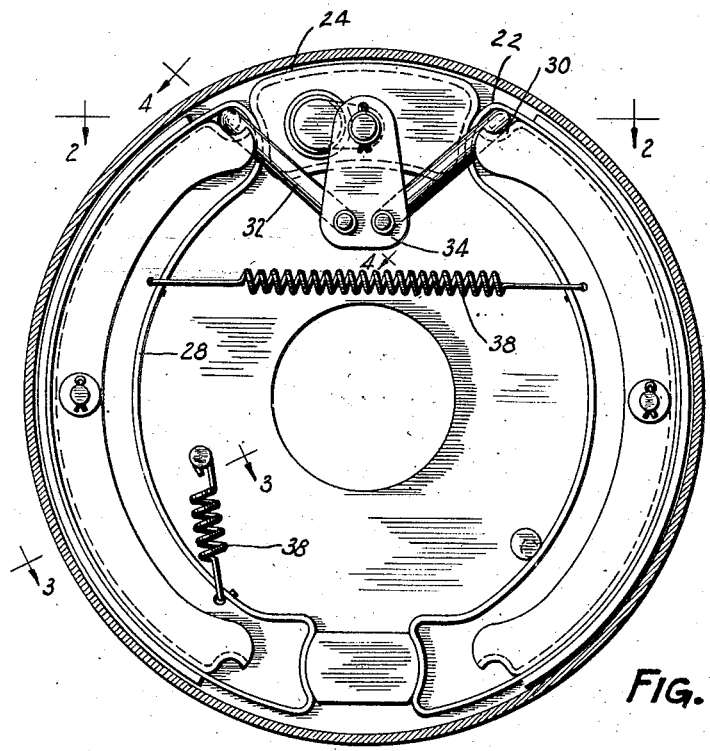
Figure 2:
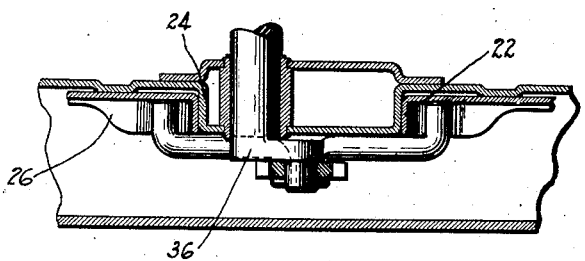
Figure 3:
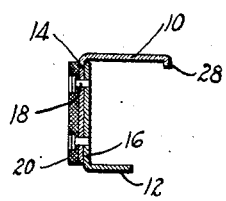
Figure 4:
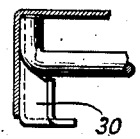

The above and other objects and features of the invention, including various novel combinations of parts and desirable particular constructions, will be apparent from the following description of one illustrative embodiment shown in the accompanying drawing, in which:

Figure 1 is a section through a brake embodying my novel shoe taken just inside the head of the brake drum;

Figure 2 is a partial section taken on the line 2—2 of Figure 1 indicating the cam and link structure, together with parts of the shoes broken away; and Figures 3 and 4 are sections taken on the lines 3—3 and 4—4, Figure 1, indicating respectively the shoe construction intermediate its ends and its connection with the cam thrust link.

The shoe selected for illustration is built up from two sections or stampings, pressed from sheet steel, and including straight radial reinforcing portions or webs 10 and 12 at opposite sides of the shoe, and superposed generally in cylindrical circumferential flanges 14 and 16, secured together by rivets or other fastenings 18, which fastenings may also serve to attach brake lining 20.

I preferably make web portion 10 longer than the web portion 12 and arrange it next the backing plate, making possible a very short anchor, thus minimizing the overhang and increasing the strength.

According to an important feature of my invention, I provide a novel arrangement of cam and shoe whereby the thrust of the cam is readily controlled and quite positive in its operation, play between these parts with the inevitable objectionable change in leverage being reduced to a minimum. This result I accomplish by continuing the circumferential flange 14 at one end of the shoe to provide flange 22 preferably rounded to nest within a correspondingly shaped anchor boss 24 on the backing plate and thence tapered at 26 to a relatively narrow reinforcing flange 28. The circumferential flange 16 is preferably turned inwardly at one end at 30 to define a cup-shaped recess, cut away at the side next the backing plate to house a laterally projected end portion of cam thrust link 32. The link is thus securely nested within the recess provided by the shoe, being confined against radial, lateral and circumferential movement by the parts described but withal capable of its necessary pivotal movement.

The thrust links are preferably actuated by a novel link 34 and a crank lever 36 all as more fully described and claimed in my co-pending application 261,068, filed March 12, 1928. The two shoes of the floating friction device shown are connected at their lower end by a novel wedge adjustment described and claimed in my co-pending application No. 285,289 filed June 14, 1928, are applied by the toggle against the resistance of the conventional return springs 38 and anchor at either end, depending upon the direction of drum rotation, upon the anchor boss 24.

While but one illustrated embodiment of my invention is shown and described in detail, it is not my intention to limit the scope of the invention to that particular embodiment, or otherwise than by the terms of the appended claims.

I claim:

1. A chanel-shaped brake shoe comprising two parts, each with a radial portion and a circumferential flange, the two circumferential flanges being superposed and the two radial portions being of unequal width and forming the sides of the channel.

2. A channel-shaped brake shoe of pressed metal having superposed portions defining the rim of the shoe, one of said superposed rim portions being inwardly bent at the shoe end to define with the sides of the channel a recess adapted to receive a cam operating part.

3. A brake shoe of channel section having the base of said channel, which defines the rim of the shoe, consisting of superposed portions, one of said portions cupped inwardly at its end and having a portion of said cupped area cut away for the purpose described.

4. A chanel-shaped brake shoe comprising a rim and sides, the rim being bent inwardly at one end of the shoe to define a recess for the purpose described.

5. A brake shoe fabricated from L-section stampings arranged to telescope one within the other, the web of one shoe being shorter than that of the other shoe.

6. A channel-shaped brake shoe having one side web thereof extended laterally at one end of the shoe to define a rounded thrust taking flange, which flange is tapered to merge into a circumferentially extending reinforcing flange at the edge of the web.

7. A brake comprising, in combination with a drum, a brake shoe fitting within said drum and consisting of two parallel sides and a connecting rim, one of said sides having a laterally extending flange at one end of the shoe, the rim being curved inwardly at said end and defining with said flange a confining recess housing one end of an operating thrust link.

In testimony whereof, I have hereunto signed my name.

LUDGER E. LA BRIE.